May 8, 1928.
R. C. AVRIL
COASTER
Filed May 5, 1925
1,668,623
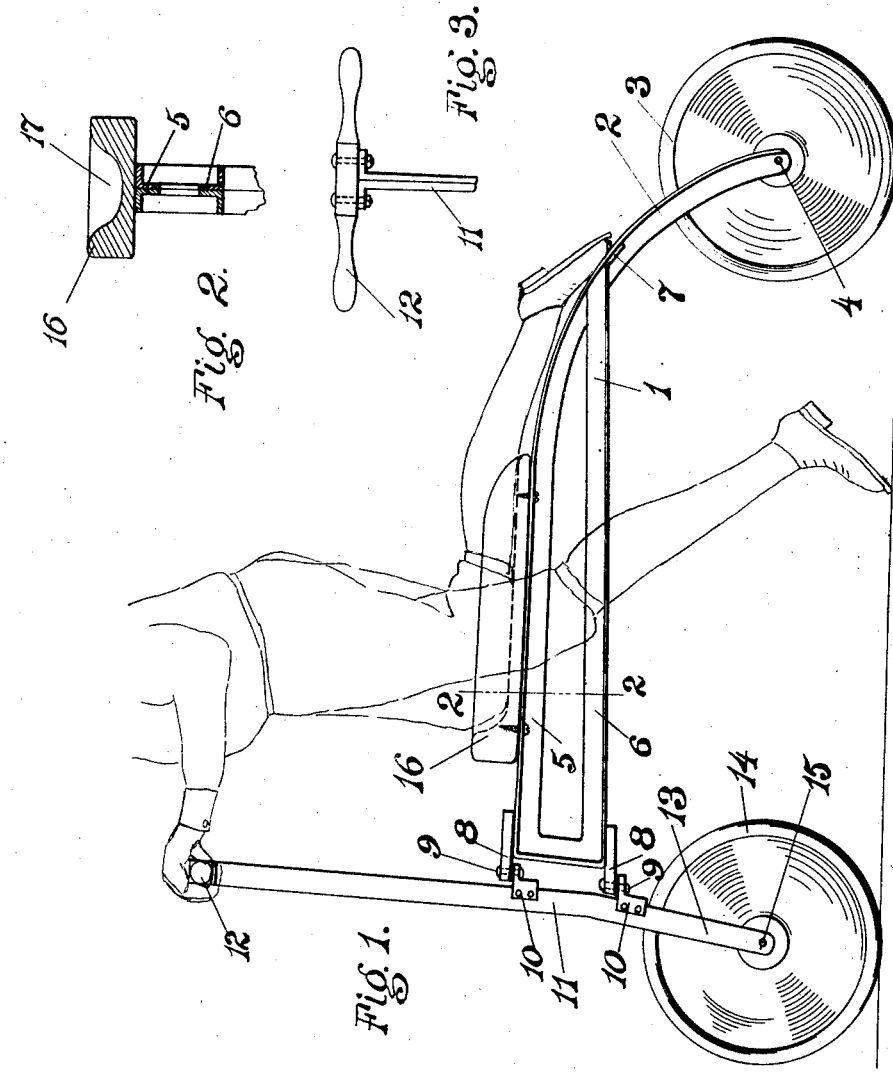
Inventor
Ralph C Avril
By
Attorney Patented May 8, 1928.

1,668,623

UNITED STATES PATENT OFFICE.

RALPH C. AVRIL, OF ERIE, PENNSYLVANIA.

COASTER.

Application filed May 5, 1925. Serial No. 28,236.

The present invention contemplates a coaster in which the operator places the knee on a knee rest in a knee high frame of the coaster and propels the same with the free foot on the pavement. The coaster is supported by a single rear wheel and a front wheel carried by a steering post with handle bars so that in the interval in which the propelling foot is off the ground the coaster is in balance with the operator resting his weight on his knee. With this device the operator can propel such a coaster with considerable speed and with slight effort and the handling of it is very quickly mastered and its operation comparatively safe. Features and details of the invention will appear from the specification and claims.

The invention is illustrated in the accompanying drawings as follows:—

Fig. 1 shows a side elevation of the device.

Fig. 2 a section on the line 2—2 in Fig. 1.

Fig. 3 a side elevation of the top of the steering post.

1 marks the frame. This is provided with a rear fork 2 in which is mounted a wheel 3 by means of an axle 4. The frame has a top bar 5 and lower bar 6 and is preferably formed of opposing angle irons bent at the front end so that the return bend forms the lower bar 6 of the frame, the rear end of this being bent at 7 and secured to the top bar to complete the frame.

The frame has the forwardly projecting plates 8 in which are provided the pivot bolts 9 which extend through the plates 8 and brackets 10. The brackets 10 are secured to the steering post.

The steering post is provided with a handle bar 12 and the fork 13 in which is arranged a steering wheel 14, the wheel 14 being mounted on an axle 15 in the fork 13.

A knee support 16 is arranged on the upper bar 5 of the frame. This knee support has a groove 17 in its upper face and is closed at its front end so as to engage the knee. The downward bend of the frame permits the operator's foot extending from the knee in the support to extend down naturally as the device is operated. It will be noted that the knee support is knee high so that the operating foot has a free swinging movement from the hip which permits of a powerful and swift propelling thrust so that the device may be driven at a very fair speed.

What I claim as new is:—

1. In a coaster, the combination of a frame; a knee-high knee support on the frame, the frame having a down bend at the rear of the knee support; a steering post on the frame; a wheel on the frame; and a wheel on the post.

2. In a coaster, the combination of a frame, said frame being formed of metal plates with a top bar, the opposing plates extending from the rear forming a fork, the bars being bent downwardly at the front end and rearwardly, the rear end being secured to the top bar; a steering post secured to the front of the frame; wheels for the frame and post; and a knee high knee support on the frame.

In testimony whereof I have hereunto set my hand.

RALPH C. AVRIL.